(12) United States Patent
Stark et al.

(10) Patent No.: US 9,107,352 B2
(45) Date of Patent: Aug. 18, 2015

(54) FURROW CUTTER

(71) Applicant: Andreas Stihl AG & Co. KG, Waiblingen (DE)

(72) Inventors: Thomas Stark, Waiblingen (DE); Juergen Haeberlein, Murrhardt (DE); David Guenther, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 99 days.

(21) Appl. No.: 13/784,249

(22) Filed: Mar. 4, 2013

(65) Prior Publication Data

US 2013/0228351 A1    Sep. 5, 2013

(30) Foreign Application Priority Data

Mar. 2, 2012   (EP) ...................................... 12001448

(51) Int. Cl.
    *A01B 33/02*    (2006.01)
    *A01B 35/28*    (2006.01)
    *A01G 3/06*    (2006.01)

(52) U.S. Cl.
    CPC ...................................... *A01G 3/062* (2013.01)

(58) Field of Classification Search
    USPC ......... 172/15, 16, 17, 120, 604, 771; 56/17.5, 56/255, 256, 295; D8/8; D15/29
    See application file for complete search history.

(56) References Cited

U.S. PATENT DOCUMENTS

| | | | |
|---|---|---|---|
| 672,536 A * | 4/1901 | Newton | 172/604 |
| 882,353 A * | 3/1908 | Speirs | 172/604 |
| 2,654,180 A * | 10/1953 | Redfield | 47/33 |
| 3,102,376 A * | 9/1963 | Henderson | 56/294 |
| 3,217,812 A * | 11/1965 | Gallion | 172/16 |
| 3,221,483 A | 12/1965 | Ronning | |
| 3,378,995 A | 4/1968 | Welsh | |
| 3,750,378 A | 8/1973 | Thorud et al. | |
| 4,030,277 A | 6/1977 | Christopherson | |
| 4,072,195 A | 2/1978 | Carlson | |
| 4,085,570 A | 4/1978 | Joray et al. | |
| 5,101,617 A | 4/1992 | Hare et al. | |
| 5,327,649 A | 7/1994 | Skinner | |
| D357,482 S * | 4/1995 | Forbush | D15/17 |
| 5,407,012 A | 4/1995 | Klopefer | |
| 5,490,371 A | 2/1996 | Potucek, III | |
| 5,890,292 A | 4/1999 | Stark et al. | |
| 6,302,219 B1 | 10/2001 | Filippini | |
| 6,615,928 B2 * | 9/2003 | Dueitt | 172/41 |
| 6,688,404 B2 | 2/2004 | Uhl et al. | |
| 8,522,518 B2 | 9/2013 | Hirose et al. | |
| 2009/0255695 A1 | 10/2009 | Breneman et al. | |
| 2013/0228350 A1 | 9/2013 | Guenther et al. | |

FOREIGN PATENT DOCUMENTS

| | | |
|---|---|---|
| DE | 297 09 152 U1 | 8/1997 |
| DE | 299 05 704 U1 | 6/1999 |

* cited by examiner

*Primary Examiner* — Gary Hartmann
(74) *Attorney, Agent, or Firm* — Walter Ottesen P.A.

(57) ABSTRACT

A blade for a furrow cutter has a planar fastening region which is located in a fastening plane. The blade is driven in rotation via a transmission arranged in a transmission housing. The fastening plans separates a first region of the furrow cutter from a second region of the furrow cutter. The transmission is arranged in the first region. The blade has at least one arm projecting from the fastening region and having a free end. The arm has a first segment which extends out of the fastening plane into the second region. A simple structure, a good cutting result and a high service life are achieved when the arm has a second segment in which the arm extends back in the direction of the fastening plane.

17 Claims, 5 Drawing Sheets

FURROW CUTTER

CROSS REFERENCE TO RELATED APPLICATION

This application claims priority of European patent application no. 12001448.5, filed Mar. 2, 2012, the entire content of which is incorporated herein by reference.

BACKGROUND OF THE INVENTION

U.S. Pat. No. 4,072,195 discloses a blade for an edge cutter. The blade has a central fastening region from which two arms extend outward. The outer sections of the arms are formed in a shovel-shaped manner and extend away from the fastening region of the blade.

DE 297 09 152 U1 discloses a blade for a lawn edging machine which has outwardly projecting arms that are bent out of the fastening plane. When this blade is used with a furrow cutter, that edge of the furrow that faces the furrow cutter extends in an inclined manner in the ground.

U.S. Pat. No. 6,302,219 B1 shows a blade for a furrow cutter. The blade is configured as a frame structure and has a comparatively complex structure.

SUMMARY OF THE INVENTION

It is an object of the invention to provide a furrow cutter of the kind described above, which has a simple structure and provides a good work result.

The furrow cutter of the invention includes: a blade having a planar fastening region defining a fastening plane; the fastening plane partitioning the furrow cutter into a first region and a second region; a transmission housing; a transmission arranged in the first region in the transmission housing and configured to rotatably drive the blade; the blade having at least one arm having a free end and projecting away from the fastening region; the arm having a first segment which extends out of the fastening plane into the second region; and, the aria having a second segment in which the arm runs back in the direction of the fastening plane.

The projecting arm of the blade can be produced easily without a complicated frame structure or the like. On account of the projecting arm, controlled wear of the blade can be achieved. In blades which are formed as a frame structure, wear in a region which connects two sections of the blade together can result in the blade breaking apart. Breaking apart of the blade at a site of wear can be easily avoided by forming the blade with at least one arm projecting from the fastening region. The fact that the arm extends first of all out of the fastening plane and then back in the direction of the fastening plane again results in high mechanical stability of the blade. On account of the resulting orientation of the arm in the second section, when the blade is used on a furrow cutter or bed redefiner, that edge of the produced furrow that faces the furrow cutter extends approximately perpendicularly and the edge that is remote from the apparatus extends in an inclined manner. As a result, an advantageous geometry of the plowed furrow is achieved. The blade has a fastening region which is arranged in a fastening plane. The fastening plane separates a first region of the furrow cutter, in which a transmission is arranged, from a second region of the furrow cutter. The first section of the arm extends out of the fastening plane into the second region. On account of the fact that the arm extends out of the fastening plane into the second region, the driveshaft, to which the blade is fastened in the fastening region, can be designed to be short. This results in a compact and stable structure. The arm extends out of the fastening plane on that side of the fastening plane that is remote from the transmission.

The furrow cutter can be pulled over the lawn area, and in the process the furrow cutter produces a sharp, in particular approximately perpendicularly extending boundary edge of the lawn area. A complicated frame structure of the blade can be avoided. The fastening region is in this case the region of the blade with which the blade is fastened to the work apparatus. To this end, the fastening region can advantageously have a fastening opening. Other means for fastening can also be provided in the fastening region. In this case, the fastening plane extends advantageously perpendicularly to a rotation axis of the blade. The first section and the second section of the blade do not in this case have to be arranged in a manner adjoining one another, but rather one or more further sections of the blade may be arranged between the first and the second section. The second section may be adjoined by further sections toward the outside with respect to the rotation axis of the blade. On account of the fact that the first section of the arm extends on that side of the fastening plane that is remote from the transmission housing, good and direct introduction of force from the transmission into the blade is achieved.

Advantageously, the arm is formed in a planar manner in the second section and extends in a manner inclined at an angle to the fastening plane. The angle which the arm encloses in the second section with the fastening plane is advantageously about 30° to about 80°. An angle of about 40° to about 70°, in particular about 50° to about 60°, has been found to be particularly advantageous. Advantageously, the second section extends up to the free end, such that the blade already extends at the mentioned angle in the region adjoining the free end. On account of the fact that the free end of the blade is located radially on the outside with respect to the rotation axis of the blade, the blade is worn in a controlled manner from outside to inside. Excess wear at a site which connects two sections of the blade together can be prevented as a result. As a result, breaking apart of the blade on account of wear is avoided.

In the second section, the blade advantageously extends as far as close to the fastening plane. The free end of the arm is advantageously at a distance from the fastening plane, the distance being measured perpendicularly to the fastening plane, of less than about 25% of the height of the blade, the height being measured perpendicularly to the fastening plane. In particular, the distance is less than about 10% of the height of the blade. Particularly advantageously, the free end is arranged approximately in the fastening plane. The first section is advantageously inclined at an angle of about 30° to about 80°, in particular about 50° to about 70°, with respect to the fastening plane. Particularly advantageously, the arm extends in an approximately planar manner in the first section and in the second section. However, an arcuate or angled course of the arm in the first section can also be advantageous. Advantageously, the arm has an approximately V-shaped form.

The arm is advantageously bent out of the fastening plane at a first bending line in a first bend region and bent back in the direction of the fastening plane at a second bending line in a second bend region. As a result, the desired profile of the blade in the second section in the direction of the fastening plane can be easily achieved. The first and second bending lines advantageously extend parallel to one another in this case. A particularly advantageous form is achieved when the first and second bending lines extend in a manner inclined at an angle of less than 90° to the longitudinal side of the blade. In particular, the angle is about 70° to about 85°. On account of the slight inclination of the bending line with respect to the longitudinal side of the blade, an inclined position of the sections of the blade to the direction of movement is achieved. The bending line advantageously extends in this case such that the region located at the rear in the provided direction of rotation of the blade is located further inward, that is to say closer to the rotation axis, in the second section of the arm of the blade. As a result, the blade acts as a shovel, in particular in the second section, and conveys cut material further.

The arm has a side located at the front in the direction of rotation and a side located at the rear in the direction of rotation. A wear section is arranged adjacent to the free end of the blade advantageously at the front in the direction of rotation, the width of the blade being increased in the wear section. The wear section is in particular approximately triangular. Advantageously, the blade has two arms opposite one another. A blade having two arms opposite one another is easy to produce. It has been shown that, in the case of a blade having two arms opposite one another, a good work result is achieved. The main body of the blade can in this case be approximately rectangular. Advantageously, the blade is bent from a single sheet metal part. The sheet metal thickness is in this case advantageously about 3 mm to about 10 mm, in particular about 5 mm to about 8 mm. The comparatively high sheet metal thickness results in high wear resistance. This is advantageous in particular when the blade is used in a furrow cutter. On account of the high wear that occurs for example in the case of use in a furrow cutter, a cost-effective blade which can be exchanged relatively frequently is desirable. This is achieved by the configuration of the blade as a bent sheet metal part and the one-piece configuration of the blade.

BRIEF DESCRIPTION OF THE DRAWINGS

The invention will now be described with reference to the drawings wherein.

DESCRIPTION OF THE PREFERRED
EMBODIMENTS OF THE INVENTION

Figures 1, 2, 3:
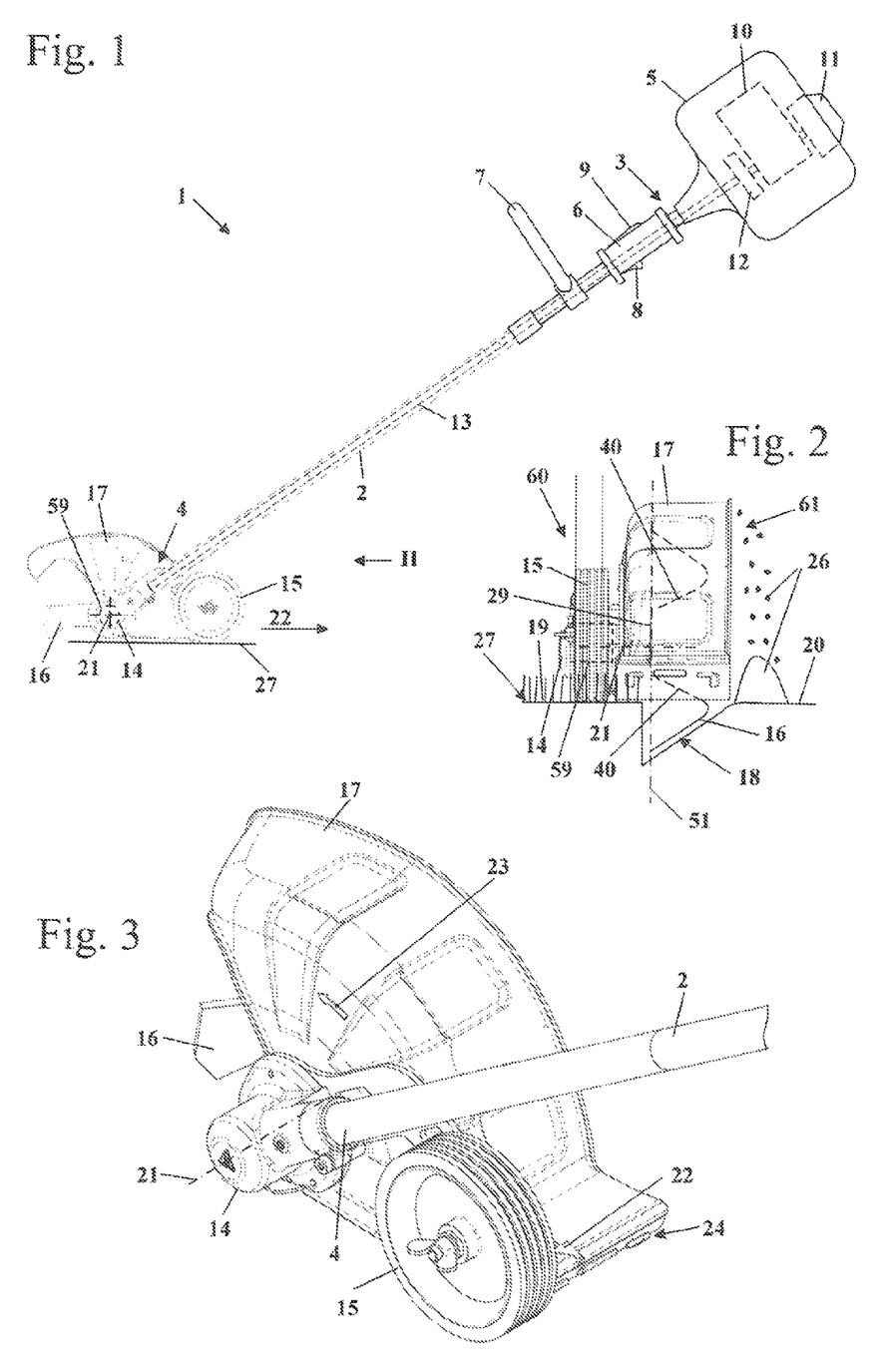
FIG. 1 is a schematic side elevation view of a furrow cutter having a blade arranged thereon.
FIG. 2 is a schematic of the furrow cutter in the direction of the arrow II in FIG. 1.
FIG. 3 is a perspective view of the cutting head of the furrow cutter.

FIG. 1 shows a furrow cutter 1. Such furrow cutters, also called bed redefiners, are used in order to plow a furrow between a lawn area and adjoining bed areas or the like and thus to create a clear boundary between these areas. However, the blade of the present invention can also be used in other work apparatuses, for example in edge cutters (edgers) or the like. Use in brush cutters, in particular as chopping blades, can also be advantageous.

The furrow cutter 1 has a guide tube 2, at the first, during normal operation upper, end 3 of which a motor housing 5 is fixed. At the other, second end 4, which faces the ground 27 during operation, there is arranged a cutting head. A handle 6, which engages around the guide tube 2, is fixed to the guide tube 2 adjacent to the motor housing 5, a throttle lever 8 and a throttle lever lock 9 being mounted on the handle 6. Further operating elements can also be arranged on the handle 6. On that side of the handle 6 that faces the cutting head, a bale handle 7 is arranged on the guide tube 2 at a short distance from the handle 6. By way of the handle 6 and the bale handle 7, an operator can guide the furrow cutter 1 and pull it in a direction of movement 22 over the ground 27.

Arranged in the motor housing 5 is a drive motor 10, which is an internal combustion engine in the embodiment shown. However, the drive motor 10 can also be an electrically driven motor. It may also be advantageous to arrange the drive motor 10 on the cutting head. Arranged on the drive motor 10 is a starter device 11, which is advantageously a pull-rope starter. The drive motor 10 is connected, via a centrifugal clutch 12, to a driveshaft 13. The driveshaft 13 passes through the guide tube 2 and drives a tool, specifically a blade 16, in rotation about a rotation axis 21 via a schematically shown transmission 59 which is arranged in a transmission housing 14 and is in the form of an angular transmission. The rotation axis 21 extends perpendicularly to the longitudinal direction of the guide tube 2 and approximately parallel to the ground 27. The blade 16 is partially covered by a protective hood 17. The protective hood 17 extends predominantly on that side of the blade 16 that faces the operator, that is, in front of and above the blade 16 in the direction of movement 22. Arranged adjacent to the protective hood 17 in that region of the protective hood 17, that is, at the front in the direction of movement 22 is a wheel 15, which roils over the ground 27 during operation.

As FIG. 2 shows, the wheel 15 is advantageously moved over a lawn area 19, specifically such that the blade 16 is arranged between the lawn area 19 and an adjacent bed area 20. During operation, the blade 16 creates a furrow 18 between the lawn area 19 and the bed area 20. The furrow 18 extends perpendicularly to the surface of the ground 27 on the side adjacent to the lawn area 19 and inclined at an angle on the side adjacent to the bed area 20. The geometry of the cross section of the furrow 18 is determined by the geometry of the blade 16. As FIG. 2 shows, the earth 26 excavated from the furrow 18 is conveyed laterally next to the furrow 18 and is ejected into the region of the bed area 20.

As FIG. 3 shows, a sliding skid 24 is integrally formed on the protective hood 17 in the region located at the front viewed in the direction of movement 22. On the protective hood 17 there is formed an arrow which indicates the direction of movement 22, and a further arrow which indicates the direction of rotation 23 of the blade 16.

Figure 4:
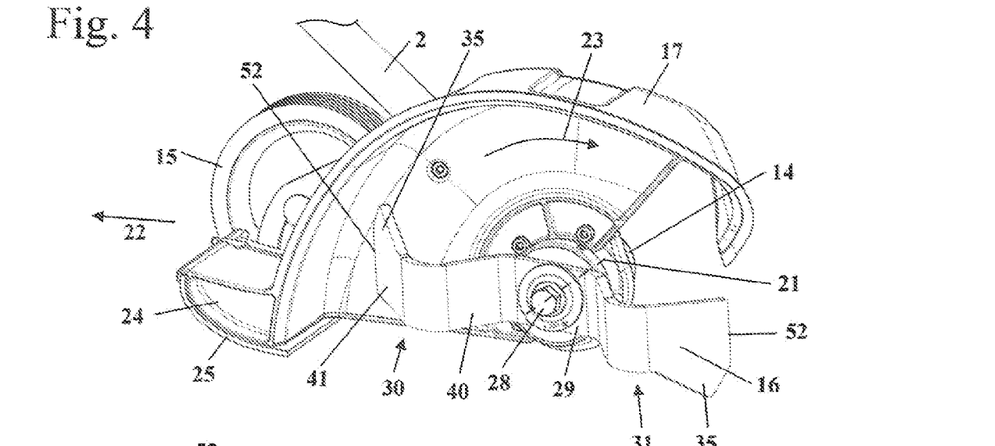
FIG. 4 is a side perspective view of the cutting head of the furrow cutter.

FIG. 4 shows that the sliding skid 24 is covered by a spray guard 25. The spray guard 25 is formed as a flexible flap in the embodiment and can flap partially downward from the sliding skid 24.

Figure 5:
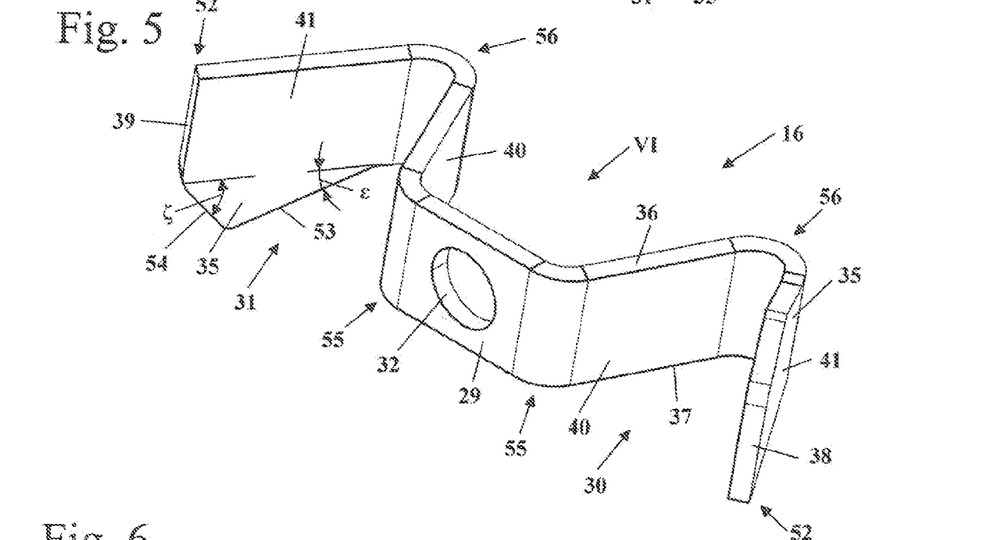
FIG. 5 is a perspective view of the blade of the furrow cutter.

As FIG. 4 shows, the blade 16 has a central fastening region 29 in which the blade 16 is fixed by way of a fastening screw 28 to a driveshaft (not shown), which advantageously projects out of the transmission housing 14. FIG. 5 shows that the blade 16 has a fastening opening 32 in the fastening region 29, the fastening screw 28 projecting through the fastening opening 32. The blade 16 has two arms 30 and 31 that project radially outwardly with respect to the rotation axis 21 and are formed in a rotationally symmetrical manner to one another about the rotation axis 21. Each arm (30, 31) has a first, inner section 40 and a second, outer section 41. The outer sections 41 extend up to the free ends 52 of the arms (30, 31).

Figure 8:
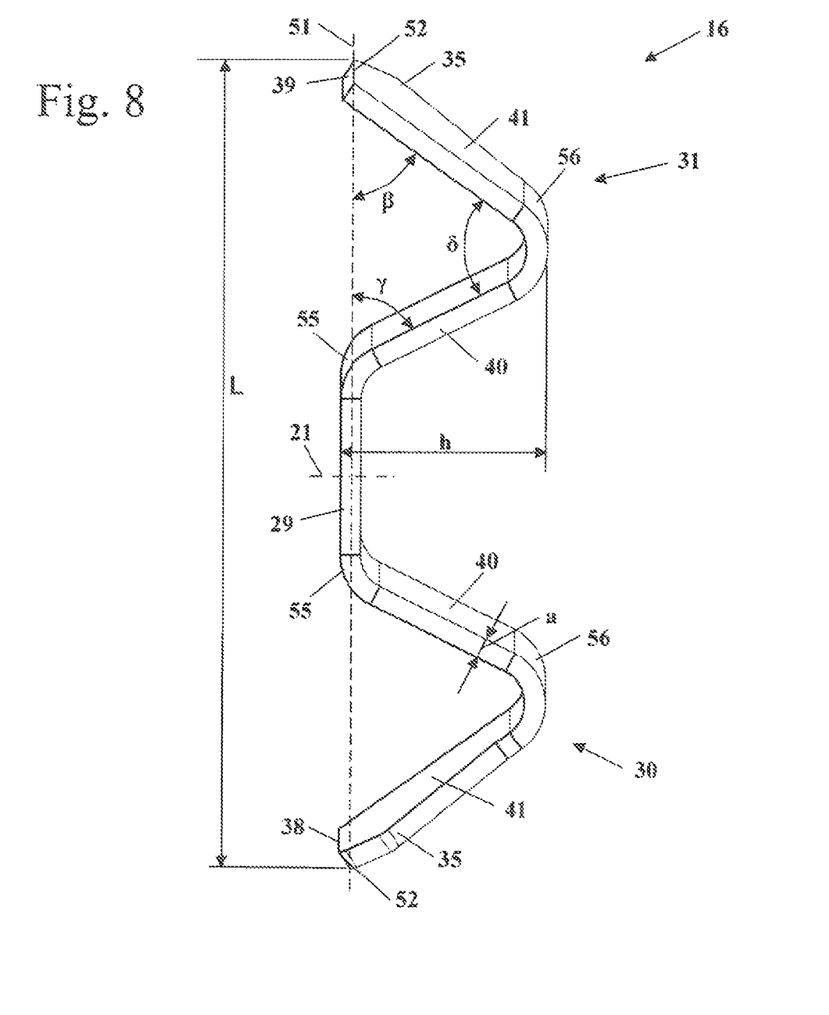
FIG. 8 is a side view in the direction of the arrow VIII in FIG. 7.

FIG. 5 shows the structure of the blade 16 in detail. The blade 16 is produced as a bent sheet metal part from a single sheet metal blank. The sheet metal blank has an elongate, approximately rectangular form. The blade 16 has an approximately W-shaped form. The arms 30 and 31 each extend in an approximately V-shaped manner and extend outwardly from opposite sides of the fastening region 29 with respect to the rotation axis 21. The fastening region 29 is adjoined on the opposite sides in each case by a first bend region 55 in which the sheet metal of the blade 16 is bent out of the fastening plane 51 shown in FIG. 8. The fastening plane 51 is the plane in which the fastening region 29 is located. The fastening plane 51 is located, as FIG. 8 shows, in the viewing direction perpendicularly to the rotation axis 21 in the geometrical center of the fastening region 29. The fastening plane 51 and the fastening region 29 extend perpendicularly to the rotation axis 21.

Each first bend region 55 is adjoined by a first section 40, which, in the embodiment, extends in a planar manner and inclined at the angle γ shown in FIG. 8 to the fastening plane 51. The angle γ is advantageously about 30° to about 30°, in particular about 50° to about 70°. In the embodiment, an angle γ of approximately 65° is provided. The first sections 40 are adjoined by a second bend region 56 in which the sheet metal of the blade 16 is bent in the opposite direction, that is, back in the direction of the fastening plane 51. The second bend regions 56 are adjoined by second sections 41, in which the blade 16 is likewise planar and inclined at the angle β shown in FIG. 8 to the fastening plane 51. The angle β is advantageously about 30° to about 80°, in particular about 40° to about 70°. Particularly advantageously, the angle β is about 50° to about 60°. In the embodiment, the angle β is approximately 55°. Advantageously, the angle β is somewhat less than the angle γ. The two sections 40 and 41 conjointly form a V. The sections 40 and 41 enclose an angle δ of advantageously about 50° to about 80° with one another. In the embodiment, the angle δ is approximately 65°. The sum of the angles β, γ and δ is in this case always 180°.

As FIG. 2 shows, the fastening plane 51 separates a first region 60 of the furrow cutter 1 from a second region 61. The fastening plane 51 is arranged between the first region 60 and the second region 61. The first sections 40 extend out of the fastening plane 51 into the second region 61. In the first region 60, the transmission 59, which is shown schematically in FIG. 2, is arranged. In the embodiment, the transmission housing 14 is also arranged in the first region 60. The arm 40 extends out of the fastening plane 51 on that side of the fastening plane 51 that is remote from the transmission 59.

FIG. 8 shows that the blade 16 has a height (h) measured parallel to the rotation axis 21 and perpendicularly to the fastening plane 51. The free ends 52 are advantageously arranged close to the fastening plane 51. Advantageously, the distance of the free ends 52 from the fastening plane 51 is less than 25%, in particular less than 10%, of the height (h). In the embodiment, the free ends 52 are arranged in the fastening plane 51.

As FIG. 5 also shows, a first outer side 38 of the blade 16 is arranged at the free end 52 of the first arm 30, and a second outer side 39 is arranged at the free end 52 of the second arm 31. The outer sides 38 and 39 are the end sides of the metal sheet forming the blade 16. The blade 16 has a first longitudinal side 36 and a second longitudinal side 37. The longitudinal sides 36 and 37 connect the outer sides 38 and 39. As FIG. 5 shows, a wear section 35 is arranged on the second section 41 in each case on that side of an arm (30, 31) that is at the front in the direction of rotation 23 (see also FIG. 4). As FIG. 5 shows, the wear section 35 on the second arm 31 has an inner edge 53 located closer to the fastening region 29 and an outer edge 54 at a greater distance from the fastening region 29. The inner edge 53 encloses an angle ε of advantageously about 10° to about 40° with the longitudinal side 37 of the blade 16. The outer edge 54 encloses an angle ζ with the extension of the longitudinal side 37. The angle ζ advantageously is greater than the angle ε and advantageously is about 40° to about 80°. The wear section 35 is arranged in the region of the blade 16 that comes into contact first with cut material, earth or the like. Therefore, in the wear section 35, the material of the blade 16 is exposed particularly heavily to wear.

Figure 7:
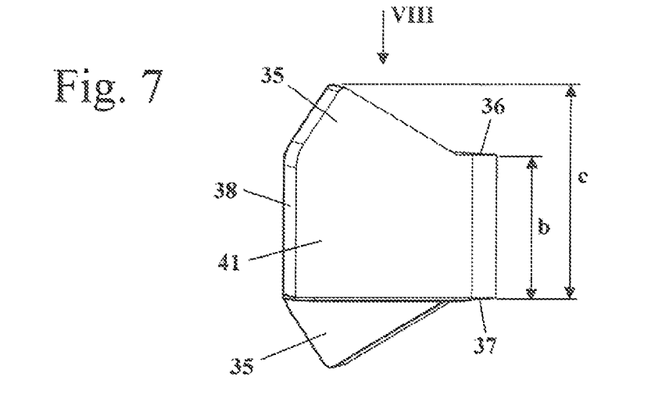
FIG. 7 is a side view in the direction of the arrow VII in FIG. 6.

As FIG. 7 shows, the blade 16 has in the wear section 35 an overall width (c) which is much greater than the width (b) in the fastening section 29 or in the first section 40. The width (c) can be, for example, about 1.2 times to 2 times the width (b). The width (b) is in this case measured parallel to the fastening plane 51 of the blade 16 and perpendicularly to the rotation axis 21 (FIG. 8). The width (b) in the fastening section 29 is the smallest width of the blade 16.

Figure 6:
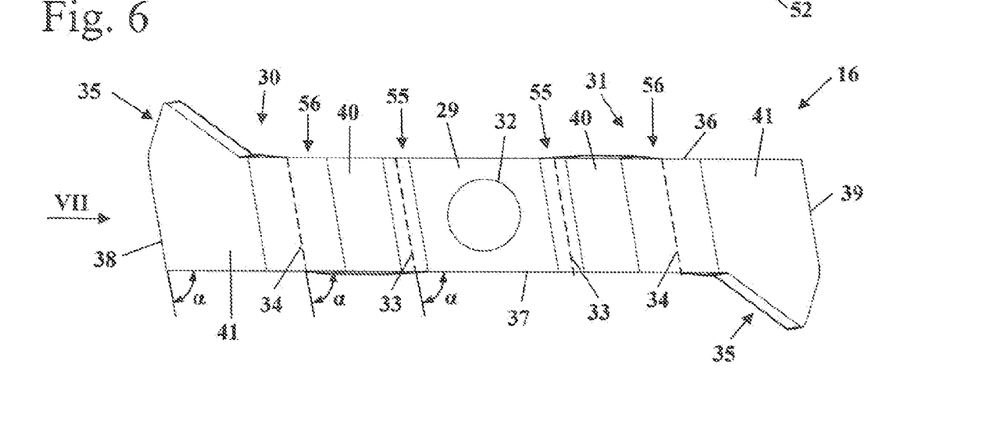
FIG. 6 is a side view of the blade approximately in the direction of the arrow VI in FIG. 5.

FIG. 6 shows the orientation of the bend regions 55 and 56. In the bend regions 55, the sheet metal of the blade 16 is bent approximately at a bending line 33, and, in the bend regions 56, it is bent approximately at a second bending line 34. FIG. 6 shows that the bending lines 33 and 34 extend parallel to one another and parallel to the outer sides 38 and 39 of the blade 16. The bending lines 33 and 34 extend in a manner inclined at an angle α of less than 90° to the longitudinal sides 36 and 37 of the blade 16. The angle α is advantageously about 70° to about 85°. The angle α is, in this case, oriented such that in the second sections 41 that side of the blade 16 that is located at the rear viewed in the direction of rotation 23 is located further inward, in each case, with respect to the rotation axis 21, than the side that is located at the front in the direction of rotation and carries the wear section 35. This can be seen in FIG. 8. Because of the inclination of the planar sections 41 with respect to the direction of movement of the blade 16, an improved cutting result is achieved, and cut material or excavated earth is conveyed along by the blade 16. As a result, good ejection can be ensured.

As FIG. 8 shows, the blade 16 has a length (L) which is measured from the first outer side 38 to the second outer side 39 and is a multiple of the height (h). The length (L) is advantageously at least twice, in particular at least 3 times, the height (h). Advantageously, the length (L) is less than 5 times the height (h). As FIG. 8 also shows, the sheet metal part forming the blade 16 has a sheet metal thickness (a). The sheet metal thickness (a) is advantageously about 3 mm to about 10 mm, in particular about 5 mm to about 8 mm. The sheet metal thickness (a) is thus comparatively large compared with conventional blades. As a result, high stability and high robustness of the blade 16 are achieved.

In the embodiment, there is shown a blade 16 which has two arms (30, 31) opposite one another. However, it may also be advantageous to provide a blade 16 with more than two arms (30, 31). The blade 16 is open toward the fastening plane 51 in the region located in each case between the arms 30 and 31. The blade 16 is configured not as a closed frame structure, but rather is produced from a single, one-piece sheet metal part by bending in the bend regions 55 and 56. This produces a simple structure.

FIGS. 9 to 14 show further embodiments of blades for a furrow cutter 1.

Figure 9:
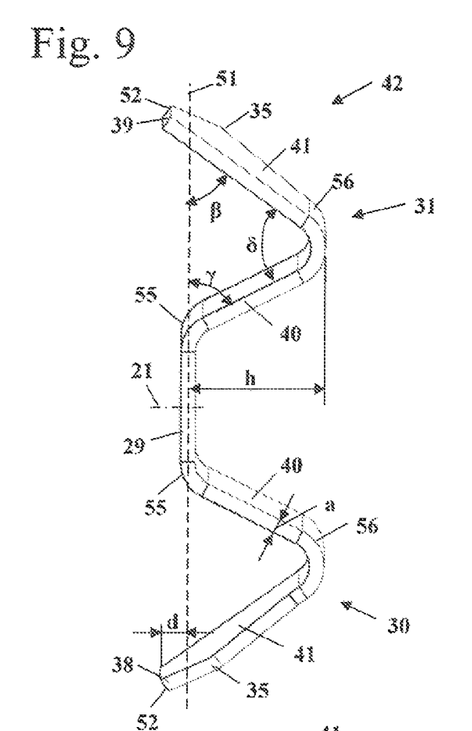
FIGS. 9 to 14 show side views of exemplary embodiments of the blade.

FIG. 9 shows a blade 42, the structure of which corresponds substantially to that of the blade 16. The same reference characters identify mutually corresponding elements in all of the figures. The blade 42 shown in FIG. 9 has free ends 52 which project beyond the fastening plane 51 onto the side facing the transmission housing 14 (FIG. 3). The second sections 41 are designed to be longer than the first sections 40 of the blade 16. The height (h) of the blade 42 is also greater than that of the blade 16. As FIG. 9 shows, the free ends 52 are at a distance (d) from the fastening plane 51, the distance (d) being measured parallel to the rotation axis 21. The distance (d) is advantageously less than about 25%, in particular less than about 20%, of the height (h). Because of the extension of the blade 42 in the sections 41, a wider trench can be produced with the blade 42 than with the blade 16.

Figure 10:
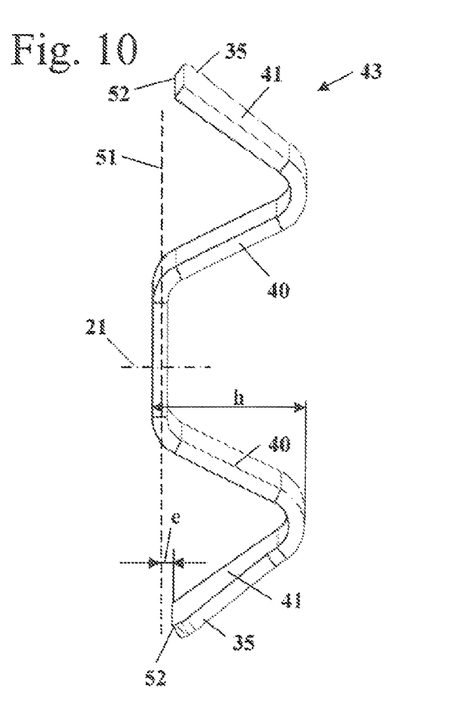

FIG. 10 shows, as a further embodiment, a blade 43, the structure of which likewise corresponds approximately to that of the blade 16. However, the second sections 41 of the blade 43 are designed to be shorter than those of the blade 16. Because of the shorter configuration of the blade 43 in the sections 41, the trench produced with the blade 43 is narrower than a trench produced with the blade 16. The free ends 52 already end before the fastening plane 51. The fastening plane 51 does not intersect the second sections 41. The free ends 52 are at a distance (e) from the fastening plane 51. The distance (e) is advantageously less than 25%, in particular less than 20%, of the height (h). In the embodiment, the distance (e) is less than 15% of the height (h).

Figure 11:
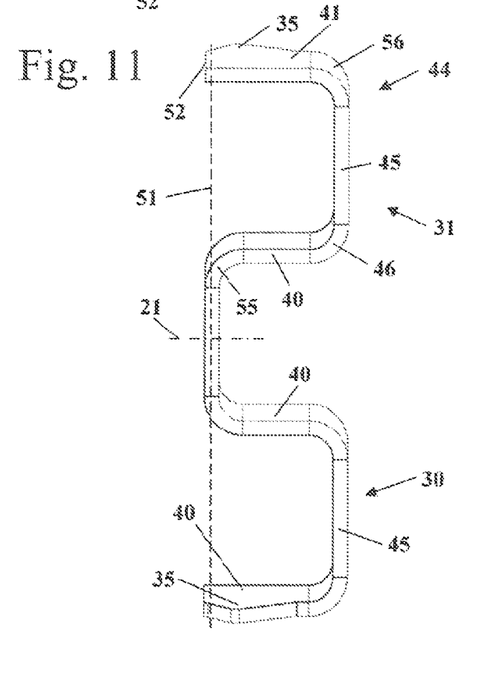

In the embodiment of a blade 44 shown in FIG. 11, the two arms 30 and 31 extend in the first section 40 approximately perpendicularly to the fastening plane 51. The first sections 40 are adjoined by a bend region 46, in which the arms (30, 31) are bent approximately through 90°. The bend region 46 is adjoined by a third section 45 of the arms (30, 31), in which, the blade 44 extends approximately parallel to the fastening plane 51. In a second bend region 56 adjoining the third section 45, the arms (30, 31) are bent through about 90° again. The blade extends back toward the fastening plane 51 in the section 41 extending in the second bend region 56. In the second sections 41, the blade extends in this case likewise approximately perpendicularly to the fastening plane 51. With the blade 44, a trench which has an approximately rectangular cross section can be produced.

Figure 12:
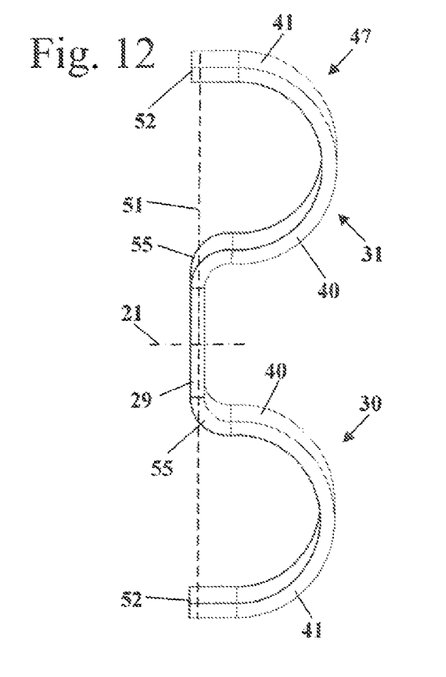

FIG. 12 shows, as a further embodiment, a blade 47, the arms (30, 31) of which extend in an approximately semicircular manner. Adjacent to the fastening region 29, the two arms (30, 31) are bent approximately at right angles out of the fastening plane 51 in the first bend regions 55. In the sections adjoining the first bend region 55, the arms (30, 31) extend in a continuous, circular curve. The circular curve comprises first sections 40 in which the blade 47 extends away from the fastening plane 51, and second sections 41 in which the blade 47 extends back in the direction of the fastening plane 51. Adjacent to the free ends 52, the arms (30, 31) have a short, straight region extending perpendicularly to the fastening plane 51. The arms 30 and 31 end approximately in the fastening plane 51.

Figure 13:
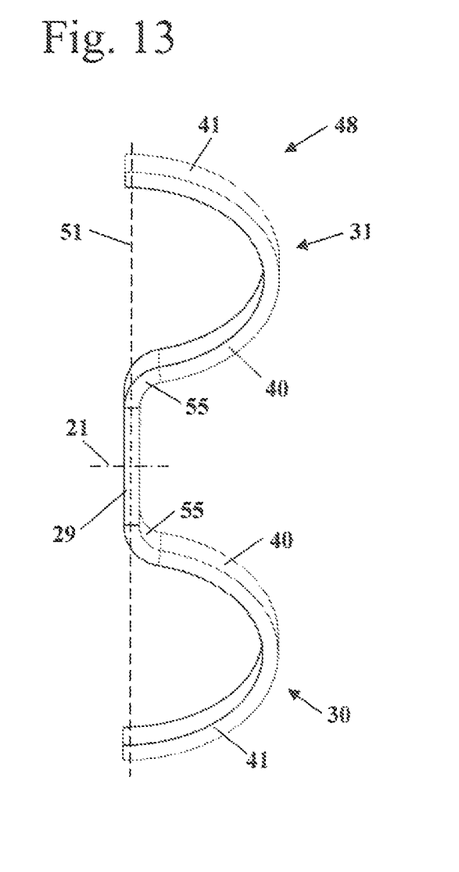

The blade 48 shown in FIG. 13 has a similar form to the blade 47, but the arms 30 and 31 do not extend in a circularly curved manner but curved in an approximately elliptical manner. The free ends 52 of the blades 47 and 48 are arranged approximately in the fastening plane 51. However, it may also be advantageous in the embodiments according to FIGS. 11 to 13 for the arms (30, 31) to already end before the fastening plane 51 or for the arms (30, 31) to be guided beyond the fastening plane 51.

Figure 14:
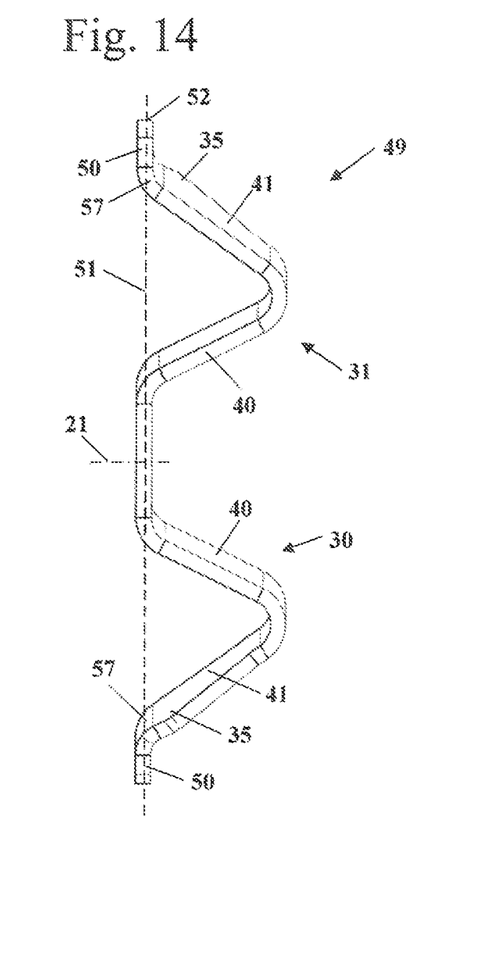

The blade 49 shown in FIG. 14 corresponds largely to the blade 16, with third sections 50 adjoining the second sections 41. The free ends 52 are arranged in the third sections 50. The arms (30, 31) are bent in third bend regions 57, which are arranged in the radially external region of the second sections 41. The third bend regions 57 are adjoined by the third sections 50. The third sections 50 extend parallel to the fastening plane 51. In the embodiment, the third sections 50 are located in the fastening plane 51. However, it may also be provided for the third sections 50 to be at a distance from the fastening plane 51. In this case, the second sections 41 can be formed in a shortened manner such that the second sections 41 end before the fastening plane 51, or the second sections 41 can be formed in an extended manner such that the fastening plane 51 intersects the second sections 41. It may be provided for the third sections 50 not to extend parallel to the fastening plane 51 but at an angle to the fastening plane 51. Advantageously, the third sections 50 extend perpendicularly to the fastening plane 51. An inclined course of the third sections 50 with respect to the fastening plane 51, wherein the third sections enclose an angle greater than 0° and less than 90° with the fastening plane 51, may also be advantageous.

Other shapes of the blade (16, 42, 43, 44, 47, 48, 49) may also be advantageous.

It is understood that the foregoing description is that of the preferred embodiments of the invention and that various changes and modifications may be made thereto without departing from the spirit and scope of the invention as defined in the appended claims.

What is claimed is:

1. A furrow cutter comprising:
a blade having a planar fastening region defining a fastening plane;
said fastening plane partitioning the furrow cutter into a first region and a second region;
a transmission housing;
a transmission arranged in the first region in said transmission housing and configured to rotatably drive said blade;
said blade having at least one arm having a free end and projecting away from said fastening region;
said arm having a first segment which extends out of said fastening plane into the second region;
said arm having a second segment in which said arm runs back in the direction of said fastening plane;
said arm of said blade defining a first bending line and a second bending line;
said first and said second bending lines being parallel to each other;
said arm being bent out of said fastening plane in a first bend region at said first bending line;
said arm being bent back in the direction of said fastening plane in a second bend region at said second bending line;
said blade having first and second longitudinal edges; and,
said first bending line and said second bending line each running inclined to one of said first and said second longitudinal edges so as to enclose an angle ($\alpha$) lying in a range of approximately 70° to approximately 85°.

2. A furrow cutter comprising:
a blade having a planar fastening region defining a fastening plane;
said fastening plane partitioning the furrow cutter into a first region and a second region;
a transmission housing;
a transmission arranged in the first region in said transmission housing and configured to rotatably drive said blade;
said blade having at least one arm having a free end and projecting away from said fastening region;

said arm having a first segment which extends out of said fastening plane into the second region;

said arm having a second segment in which said arm runs back in the direction of said fastening plane;

said blade being made of a single, one-piece sheet metal part;

said blade having a width (c) and being configured to have a direction of rotation;

said arm having a forward side and a rearward side with respect to said direction of rotation; and, said blade having a wear section whereat said width (c) is enlarged and said wear section is arranged on said sheet metal part on said forward side of said arm adjacent to said free end of said blade.

3. The furrow cutter of claim 2, wherein said sheet metal part defines said blade being configured to have a geometry determining the geometry of the cross section of a furrow generated by said sheet metal part.

4. The furrow cutter of claim 2, wherein said arm is configured to be planar in said second segment and is inclined at an angle (β) with respect to said fastening plane.

5. The furrow cutter of claim 4, wherein said angle (β) lies in a range between approximately 30° and approximately 80°.

6. The furrow cutter of claim 4, wherein said angle (β) lies in a range between approximately 40° and approximately 70°.

7. The furrow cutter of claim 4, wherein said angle (β) lies in a range between approximately 50° and approximately 60°.

8. The furrow cutter of claim 2, wherein said second segment extends up to said free end.

9. The furrow cutter of claim 2, wherein:

said blade has a height (h) measured perpendicularly to said fastening plane;

said free end of said arm is at a distance (d) to said fastening plane measured perpendicularly to said fastening plane; and, said distance (d) is less than approximately 25% of said height (h).

10. The furrow cutter of claim 2, wherein:

said blade has a height (h) measured perpendicularly to said fastening plane;

said free end of said arm is at a distance (d) to said fastening plane measured perpendicularly to said fastening plane; and, said distance (d) is less than approximately 10% of said height (h).

11. The furrow cutter of claim 2, wherein said first segment is inclined at an angle (γ) lying in a range of approximately 30° to approximately 80° with respect to said fastening plane.

12. The furrow cutter of claim 2, wherein said first segment is inclined at an angle (γ) lying in a range of approximately 50° to approximately 70° with respect to said fastening plane.

13. The furrow cutter of claim 2, wherein said arm has an approximately V-shaped configuration.

14. The furrow cutter of claim 2, wherein said wear section has an approximately triangular shape.

15. The furrow cutter of claim 2, wherein said arm is a first arm and said blade includes a second arm; and, said first and second arms are disposed opposite each other.

16. The furrow cutter of claim 2, wherein said blade is made of a single bent sheet metal part having a thickness (a) of approximately 3 mm to approximately 10 mm.

17. The furrow cutter of claim 2, wherein said blade is made of a single bent sheet metal part having a thickness (a) of approximately 5 mm to approximately 8 mm.

\* \* \* \* \*

UNITED STATES PATENT AND TRADEMARK OFFICE
CERTIFICATE OF CORRECTION

| | | |
|---|---|---|
| PATENT NO. | : 9,107,352 B2 | Page 1 of 1 |
| APPLICATION NO. | : 13/784249 | |
| DATED | : August 18, 2015 | |
| INVENTOR(S) | : T. Stark et al. | |

It is certified that error appears in the above-identified patent and that said Letters Patent is hereby corrected as shown below:

In The Specification

In column 1:
Line 40: delete "aria" and substitute -- arm -- therefor.

In column 5:
Line 23: delete "30°, in" and substitute -- 80°, in -- therefor.

Signed and Sealed this
First Day of March, 2016

Michelle K. Lee
*Director of the United States Patent and Trademark Office*